United States Patent [19]

Callaghan et al.

[11] Patent Number: 5,737,523
[45] Date of Patent: Apr. 7, 1998

[54] METHODS AND APPARATUS FOR PROVIDING DYNAMIC NETWORK FILE SYSTEM CLIENT AUTHENTICATION

[75] Inventors: Brent P. Callaghan, Mountain View; Michael R. Eisler, San Jose, both of Calif.

[73] Assignee: Sun Microsystems, Inc., Palo Alto, Calif.

[21] Appl. No.: 610,704

[22] Filed: Mar. 4, 1996

[51] Int. Cl.$^6$ ................................................ G06F 15/163
[52] U.S. Cl. ............................... 395/187.01; 395/200.59; 395/200.55
[58] Field of Search .......................... 395/187.01, 200.06, 395/200.09, 186, 610, 616, 617, 200.59, 200.55, 200.33

[56] References Cited

U.S. PATENT DOCUMENTS

| | | | |
|---|---|---|---|
| 5,001,628 | 3/1991 | Johnson et al. | 395/617 |
| 5,113,519 | 5/1992 | Johnson et al. | 395/617 |
| 5,452,447 | 9/1995 | Nelson et al. | 395/621 |
| 5,481,720 | 1/1996 | Loucks et al. | 395/187.01 |
| 5,560,008 | 9/1996 | Johnson et al. | 395/680 |

OTHER PUBLICATIONS

Richard E. Smith, "MLS File Service for Network Data Shaving," Computer Security Applications Conference, 1993, pp. 94–99.

Rainer Tobbicke, "Distributed File Systems=Focus on Andrew File System/Distributed File Service (AFS/DFS)," 1994 13th IEEE Symposium on Mass Storage Systems, pp. 23–26.

Eliezer Levy et al., "Distributed File Systems =Concepts and Examples," ACM Computing Surveys, vol. 22 No. 4, 1990, pp. 321–374.

B. Clifford Neuman, "Proxy–Based, Authorization and Accounting for Distibuted Systems," 1993 Int'l Conference on Distributed Computing Systems, pp. 283–291.

Debra Herman, UNIX System V NFS Administration, 1993, System Administrator Collection, pp. 69–79.

*Primary Examiner*—Paul V. Kulik
*Attorney, Agent, or Firm*—Hickman Beyer & Weaver, LLP

[57] ABSTRACT

A variety of methods and apparatus are taught for providing dynamic distributed file system client authentication. One method for providing dynamic distributed file system client authentication within a distributed file system computing environment includes the steps of receiving an NFS request from an NFS client, determining whether the NFS client has an access status sufficient to perform the NFS request, and performing the NFS request when the NFS client has sufficient access status. In some embodiments, the NFS request includes a file handle representing a given file system available on the server computer system and a file operation to be performed upon the given file system. A server computer in accordance with one embodiment of the present invention is operable to provide dynamic NFS client authentication. The server computer includes a CPU, a RAM accessible by the CPU, a ROM accessible by the CPU, a network I/O port coupled with the CPU, a mass storage device accessible by the CPU, and a kernel implemented on the server computer. In addition, the server computer implements a dynamic NFS client authentication service operable to receive an NFS request from an NFS client and to authenticate the NFS client in relation to the NFS request. The dynamic NFS client authentication service considers factors such as time, date, identity of the NFS client, a nature of the NFS request, and a current status of a resource upon which the NFS request operates.

30 Claims, 10 Drawing Sheets

METHODS AND APPARATUS FOR PROVIDING DYNAMIC NETWORK FILE SYSTEM CLIENT AUTHENTICATION

BACKGROUND OF THE INVENTION

The present invention relates generally to file sharing over a computer network. More specifically, the present invention teaches methods and apparatus for providing dynamic client authentication in a distributed computer file system.

Sun Microsystems, Inc.'s "Distributed File System", designated as NFS®, is a computer implemented service designed to allow computer systems to share files across a computer network. In brief, file systems are mounted across the network, making them appear as if a local computer system is accessing the file system locally when in fact the files are stored on a remote server computer. Thus, using NFS, it is possible to share individual files, file hierarchies, and entire file systems across a network.

NFS employs a client/server paradigm. A computer that wishes to share its file system with other computers on the network acts as a server computer. Files are physically located on and managed by the server computer. A separate computer that wishes to access files located on the server computer acts as a client of the server computer. In order to access files located on the server computer, the client computer first mounts the required file system and then makes file access requests across the network to the server. In general, a computer may simultaneously operate as a client and a server.

FIG. 1 diagramatically illustrates an NFS client/server paradigm 10 of the prior art. The NFS client/server paradigm 10 includes an NFS client 12 and an NFS server 14. The NFS server 14 includes a kernel 16 and a mount daemon 18. As will be well familiar to those of skill in the art, the kernel 16 typically implements the most primitive functions of the server's operating system. Additionally, because the kernel 16 is generally resident in random access memory (RAM), it is sound programming strategy to minimize the memory space required by these primitive functions.

The mount daemon 18 is a process implemented on the server 14 which autonomously answers file system mount requests, making available those file systems which the clients may legitimately access. When the NFS client 12 attempts to mount a given file system 30, the mount daemon 18 authenticates that the NFS client 12 is entitled to access the given file system 30 and, if so, returns a file handle 24 corresponding to the given file system 30. The file handle 24 serves as a key facilitating all further requests between the NFS client 12 and the NFS server 14 with regards to the given file system 30.

Once the NFS client 12 obtains a file handle 24, all file system requests are handled by an NFS service 20 implemented within the kernel 16. Each file system request such as NFS request 22 includes both the file handle 24 and a file operation 26. When the file handle 24 is valid, the NFS service 20 executes the file operation 26 as a matter of course, without authenticating the NFS client 12. When necessary, the NFS service 20 returns an NFS response 28, providing the NFS client 12 with either the requested file information or a message indicating success or failure of the requested file operation 26.

While the prior art NFS paradigm 10 provides resource sharing across a network, it inherently creates a potential for security risks within the network. As used herein, security risks include unauthorized access to resources found on an NFS server computer. In particular, prior art NFS implementations only provide what is herein termed static client authentication mechanisms.

A static client authentication mechanism operates only once with respect to a client's log in session: initially when the client attempts to mount resources. In perhaps the least secure situations the mount daemon 18 simply verifies that the NFS client 12 is entitled to access by comparing the NFS client 12 and the mount request with the client's access status stored in a file generally called sharetab (for share table). As will be appreciated, a client's access status to a given file system 30 can be either "no access", "ro" for read only access, or "rw" for read and write access. When the client's access status satisfies the mount request, the NFS client 12 receives a valid file handle 24 for use in subsequent NFS requests.

Therefore, a static client authentication mechanism can protect NFS servers from unauthorized NFS clients lacking a valid file handle. However, even the more sophisticated static client authentication mechanism relies on the assumption that clients having valid file handles are authorized to access the server's file system corresponding to the valid file handle. No protection is provided against attacking clients who have guessed or misappropriated valid file handles.

FIG. 2 is a flow chart illustrating a security breach 50 of an NFS server 14 by an attacking client 12 having a valid file handle 24. The breach 50 starts in a step 52. At step 52 the attacking client has unauthorized possession of a valid file handle 24. The attacking client may have guessed or misappropriated the valid file handle 24 by eavesdropping on the network. In a step 54 the attacking client 14 makes an NFS request 22 including the valid file handle 24. Because the current NFS request 22 includes the valid file handle 24, the NFS service 20 performs the requested file operation 26. Then, in step 56, the attacking client receives back the desired response and security of the server 14 is breached.

While the example of FIG. 2 focused on security risks posed by attacking clients, security problems exist even with respect to clients whose access status has changed subsequent to mounting the given file system 30. This is because, once an NFS client 12 has mounted within the prior art NFS client/server paradigm 10, the only way an NFS server 14 can enforce the client's new access status to given file system 30 is to force the NFS client 12 to unmount the given file system 30 and then mount the given file system 30 again.

Accordingly, what is needed is a dynamic NFS client authentication mechanism which provides NFS client authentication upon every NFS request. Such a dynamic NFS client authentication mechanism should insure that only authorized clients are allowed to access a server's file systems, regardless of whether the client's request includes a valid file handle. In addition, the dynamic NFS client authentication mechanism should enable a server to dynamically alter a client's access status without altering a client's server connection status.

SUMMARY OF THE INVENTION

To achieve the foregoing and other objectives and in accordance with the purpose of the present invention, a variety of methods and apparatus are disclosed herein. A first aspect of the present invention teaches a method for providing dynamic network file system client authentication within a distributed file system computing environment. The method is implemented upon an NFS server computer system and includes the steps of receiving a network file system request from an NFS client, determining whether the NFS client has an access status sufficient to perform the NFS request, and performing the NFS request when the NFS client has sufficient access status. According to some embodiments, the NFS request includes a file handle representing a given file system available on the server computer system and a file operation to be performed upon the given file system.

In accordance with another aspect, an export information table is resident on the server computer system. An entry in the export information table for the given file system includes a read only bit and a read-write bit. The read only bit indicates global read only access status, while the read-write bit indicates global read and write access status. According to this aspect, the export information table is searched to determine whether the NFS client has an access status sufficient to perform the NFS request. When the read only bit is set, the client's access status is set to read only. Similarly, when the read-write bit is set, the client's access status is set to read-write. Thus when the entry in the export information table is determinative of the client's access status, it is then directly determined from the client's access status whether the requested NFS operation can be performed.

In a further related aspect, when the entry in the export information table is not determinative of the client's access status (neither bit is set), a cache memory is searched for a specific export authentication cache entry for the NFS client which corresponds to the given file system. When present, the specific export authentication cache entry indicates the client's access status for the given file system thereby enabling direct determination of whether the requested NFS operation can be performed. When not present, the specific export authentication cache entry is first created.

One embodiment of the present invention teaches a server computer for use in a NFS computing environment, the server computer operable to provide dynamic NFS client authentication. The server computer includes a CPU, a RAM accessible by the CPU, a ROM accessible by the CPU, a network I/O port coupled with the CPU, a mass storage device accessible by the CPU, and a kernel implemented on the server computer. The mass storage device is capable of storing a given file system modifiable by clients of the server computer having an access status of read-write for the given file system, readable by clients of the server computer having the access status of read only for the given file system, and inaccessible to other clients. In addition, the server computer implements a dynamic NFS client authentication service operable to receive an NFS request from an NFS client and to authenticate the NFS client in relation to the NFS request. The dynamic NFS client authentication service considers factors such as time, date, identity of the NFS client, a nature of the NFS request, and a current status of a resource upon which the NFS request operates.

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF THE INVENTION

Figure 3:
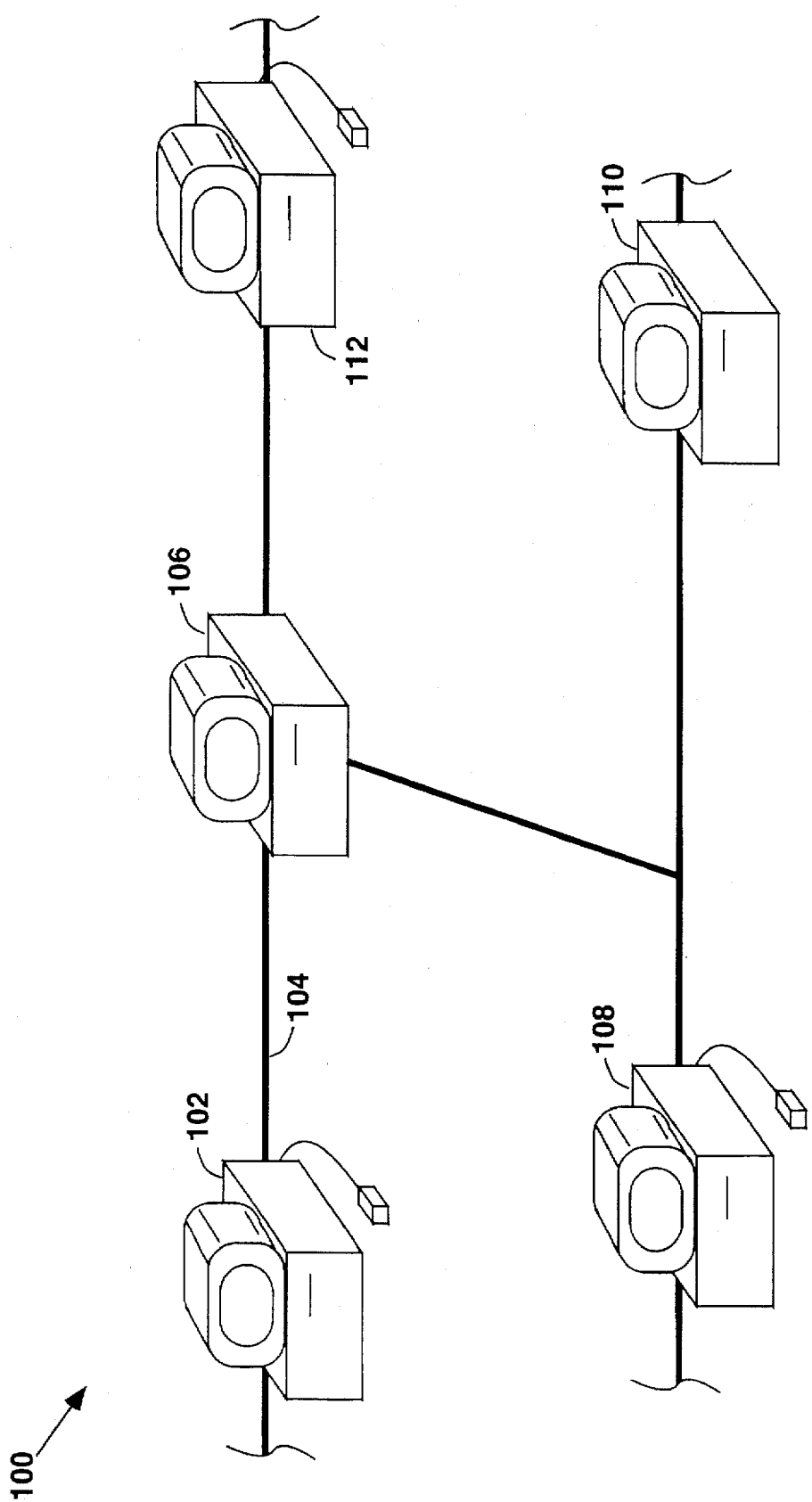
FIG. 3 is a pictorial illustration of various computers linked together in a computer network.

In a preferred embodiment of the present invention, a distributed file system computing environment is implemented on a server computer and one or more client computers linked together by a network. The network may take any suitable form. By way of example, a representative network arrangement 100 is illustrated in FIG. 3. The network arrangement 100 includes a first computer 102 which is coupled to a transmission line 104. The network 100 further includes a router or the like 106 in addition to other computers 108, 110, and 112 such that NFS requests and NFS replies can be passed among the networked computers. As will be appreciated, any of computers 102, 106, 108, 110, and 112 may be configured as an NFS server, an NFS client, or both. The design, construction and implementation of computer networks will be familiar to those of skill in the art.

Figure 4:
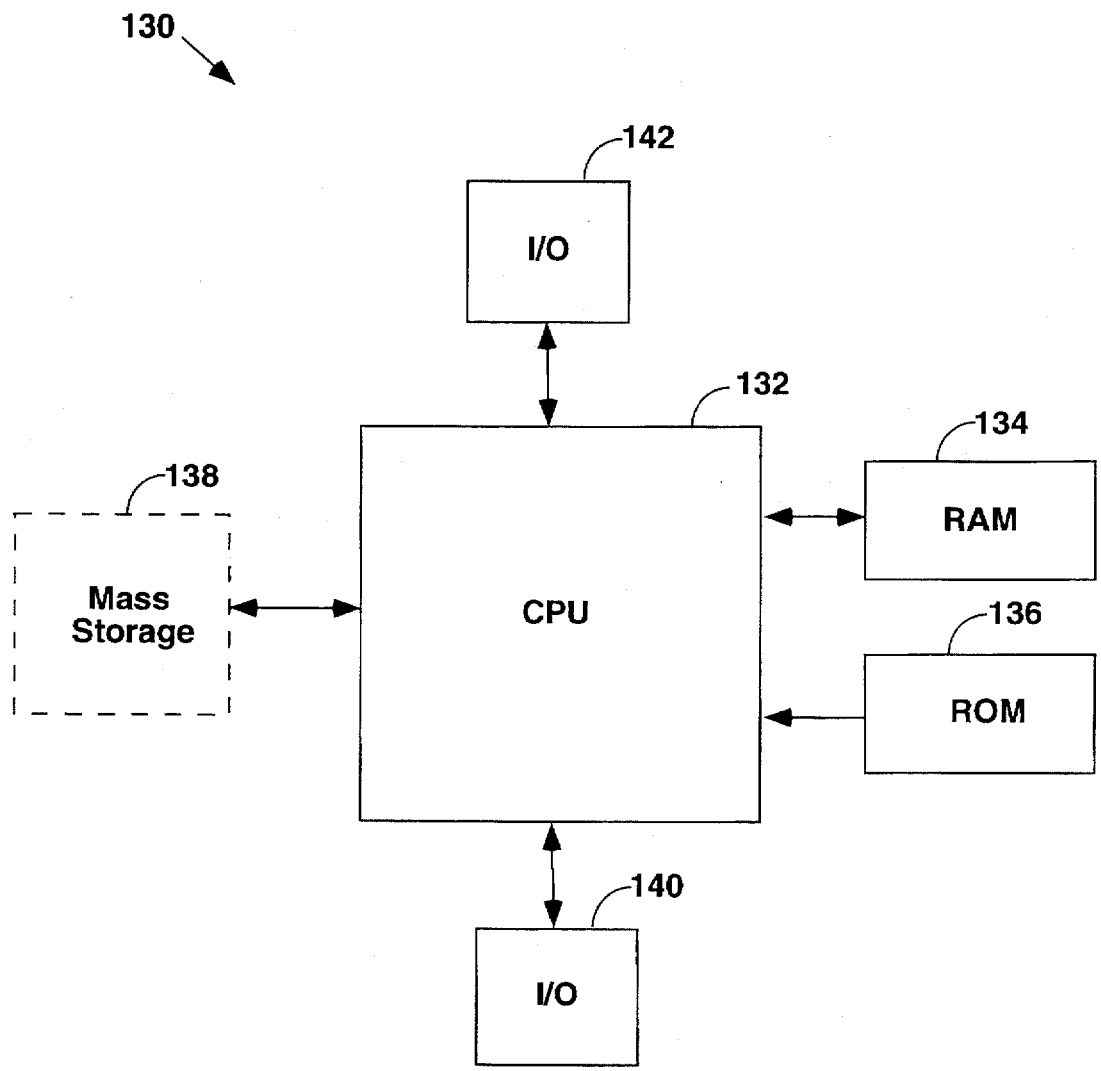
FIG. 4 illustrates diagrammatically the major components of a computer in FIG. 3.

A representative computer 130 suitable for use as computers 102, 108, 110, and/or 112 of FIG. 3 is illustrated schematically in FIG. 4. Computer 130 includes a central processing unit (CPU) 132 which is coupled with random access memory (RAM) 134 and with read only memory (ROM) 136. Typically, RAM 134 is used as a "scratch pad" memory and includes programming instructions and data for processes currently operating on CPU 132. ROM 136 typically includes basic operating instructions and data used by the computer 130 to perform its functions. In addition, a mass storage device 138, such as a hard disk, CD ROM, magneto-optical (floptical) drive, tape drive or the like, may be optionally coupled with CPU 132.

The mass storage device 138 is optional for an NFS client, but typically an essential element of an NFS server. This is because, in order to play a useful role, the NFS server ought to maintain substantial file systems. However, the methods and apparatus of the present invention may be implemented upon a computer 130 which does not include a mass storage device 138. The mass storage device 138 of an NFS server includes data in the form of file systems potentially accessible by all NFS clients on the network 100. In addition, the mass storage device 138 often includes additional programming instructions, data and objects that typically are not in active use by the CPU 132, although the address space may be accessed by the CPU 132, e.g., for virtual memory or the like.

Each of the above described computers includes a network input/output source 140 which is coupled with a network such as network 100. The network input/output source may take any suitable form. Further, the above described computers optionally includes an additional input/output source 142 such as a keyboard, pointer devices (e.g., a mouse or stylus) and/or display connections. It will be appreciated by those skilled in the art that the above described hardware and software elements, as well as the networking devices, are of standard design and construction, and will be well familiar to those skilled in the art.

Figure 5:
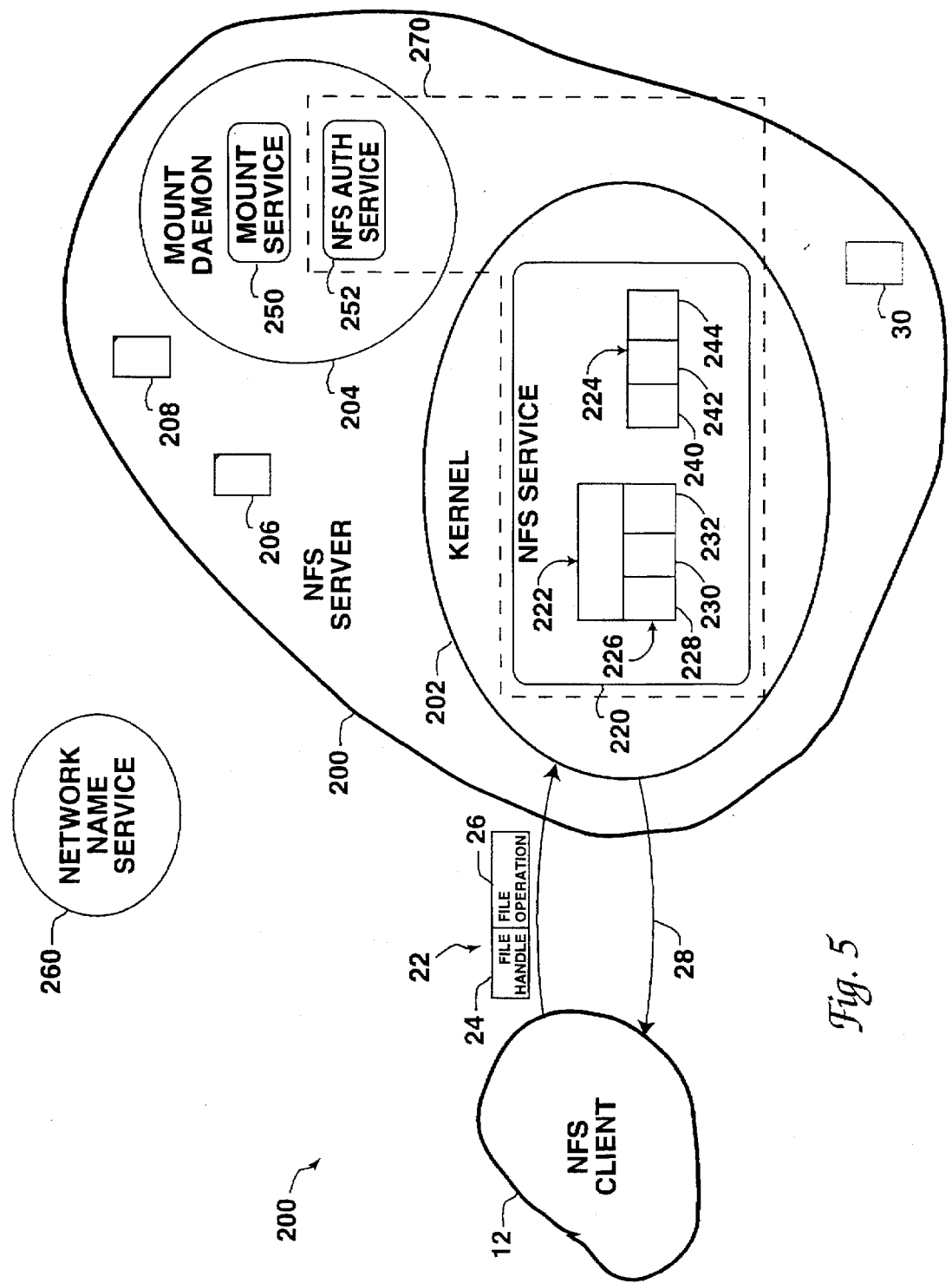
FIG. 5 is a pictorial illustration of an NFS client/server paradigm in accordance with one embodiment of the present invention.

Turning next to FIG. 5, an NFS client/server paradigm 198 in accordance with one embodiment of the present invention will now be described. The NFS client/server paradigm 198 includes an NFS client 12 and an NFS server 200. The NFS client 12 and the NFS server 200 may take any suitable form such as a computer 130. The NFS client 12 and the NFS server 200 are typically connected over a network such as network 100 and may communicate via NFS requests and responses such as NFS request 22 and an NFS response 28. In preferred embodiments of the present invention, the NFS request 22 follows a format identical to that of the prior art NFS client/server paradigm 10, having a file handle 24 and a file operation 26. Therefore, preferred embodiments of the present invention are backwards compatible with prior art NFS paradigms. As will be appreciated, the file handle 24 is an identifier or key to a given file system 30 provided to the NFS client 12 during an earlier successful mount request. In general, the given file system 30 may represent any NFS resource available on the server computer. Example NFS resources include such resources as a file and a file system hierarchical structure.

Included in the NFS server 200 are a kernel 202, a mount daemon 204, a dfstab file 206, and a share table file 208. As will be appreciated by those familiar with the NFS computing environment, the dfstab file 206 is a text file listing both the resources that the NFS server 200 is making available for sharing, the clients allowed to access the shared resources, and the access status of such clients. The share table file 208 is generated from the dfstab file 206 and provides similar information, but in a format more useful to the mount daemon 204.

As will be appreciated, the kernel 202 implements the more primitive functions of the server's operating system which in the NFS paradigm 198 includes an NFS service 220. As described below with reference to FIGS. 9-13, the NFS service 220 manages all NFS requests. In order to enable such management, the NFS service 220 includes an export information table 222 and may include export authentication information such as an export authentication cache 224 for a specific client stored in cache memory. The export information table 222 provides information regarding the global access status to listed resources. That is, any access status provided in the export information table 222 applies to all NFS clients.

According to one embodiment of the present invention, the export information table 222 has entries such as entry 226 having a file system identifier 228, a read only (ro) bit 230, and a read-write (rw) bit 232. The file system identifier 228 may take any suitable form such as a file path. The ro bit 230 is set when all clients have read only access status with regards to the resource represented by the file system identifier 228. Similarly, the rw bit 232 is set when all clients have read and write access status with regards to the resource represented by the file system identifier 228. The ro bit 230 and the rw bit 232 are exclusive; only one of the two may be set. Of course, the ro bit 230 and the rw bit 232 may be implemented by another format representing equivalent information. For example, the ro bit 230 may be an ASCII string wherein the value "TRUE" indicates that all clients have read only access status.

The export authentication cache 224 provides information regarding an access status of a specific client. In the embodiment of FIG. 5, the export authentication cache 224 has a client identifier 240, a file system identifier 242, and a client access status 244. By way of example, the client identifier 240 may be a network source address, the file system identifier 242 may be a file path or other suitable identifier, and the client access status 244 may be a parameter indicating one of no access, read only access, or read and write access. As will be appreciated, the client access status 244 indicates the access status of the NFS client 12 with respect to the resources identified by the file system identifier 242.

In the embodiment of FIG. 5, the mount daemon 204 includes a mount service 250 and an NFS authentication service 252. As will be appreciated, a daemon is an autonomous process. In essence, a process within a computer has at least one thread of execution as well as exclusively allocated memory. The mount service 250 autonomously answers file system mount requests, making available those file systems which the NFS server 200 is willing to share. When the NFS client 12 attempts to mount a given file system 30, the mount service 250 authenticates that the NFS client 12 is entitled to access the given file system 30 and, if so, returns a file handle 24 corresponding to the particular file system. As will be appreciated, the mount service 250 essentially implements the functionality of the mount daemon 18 of the prior art.

The NFS server 200 also includes a dynamic NFS client authentication service 270. In embodiments such as that of FIG. 5, the dynamic NFS client authentication service 270 includes the NFS service 220 and the NFS authentication service 252. According to the present invention, for each NFS request 22, the dynamic NFS client authentication service authenticates the requesting NFS client 12. The steps involved in authenticating the NFS client 12 may include the following.

Initially an NFS request 22 including a file handle 24 and a file operation 26 is received. Then, a client's access status for a given file system 30 indicated by the file handle 24 is determined. The criteria for determining the client's access status may vary, but a fundamental criterion is the client's access status for the given file system 30 as provided in the share table file 208. However, this information may also be provided (directly or indirectly) in the export information table 222 or as an entry in the cache 224; in which case, the share table file 208 need not be consulted. Beyond this fundamental criterion, the client's access status may be further limited or expanded by other parameters.

For example, in some embodiments it may be desirable to limit access to certain resources during peak usage periods. A commercial on-line service may impose a hierarchy in its membership structure. The lowest level members would only have access to high demand resources during non-peak usage periods. In contrast, the highest level members access would never be limited. Another criterion which would be suitable for controlling access would be a current status of the given file system 30. For example, if the given file system 30 was currently off line, it may be desirable to limit access even though the NFS server 200 originally intended to share the file system 30. Accordingly, such information would be utilized by the dynamic NFS client authentication service 270 when authenticating the NFS client 12.

In any event, once the client's access status for the given file system is determined as one of no access, read only access, or read-write access, the authentication process continues by determining the nature of the file operation 26. For example, the file operating may be a read or write operation. Then, the client's access status is compared with the nature of the file operation 26 in order to determine if the file operation 26 should be executed. For example, if the file operation 26 requires modifying the given file system 30 but the client's access status is read only access, then the file operation 26 is unauthorized and will not be executed.

As seen in FIG. 5, preferred embodiments of the dynamic NFS client authenticating service 270 are implemented by multiple components. One rationale for providing only a portion (the NFS service 220) of the dynamic NFS client authenticating service 270 within the kernel is as follows. The kernel 200 is typically implemented in precious (in terms of cost and availability)random access memory such as RAM 134. As will be appreciated, the most time efficient response would arise from implementing the entire dynamic NFS client authenticating service 270 within the kernel. However, the costs of utilizing RAM 134 for the NFS service 220 must be balanced with the need for conserving RAM 134 for other software running on the NFS server 200.

In essence, the NFS service 220 ought to provide a minimal dynamic NFS client authentication. This includes the capability to (a) authenticate an NFS client 12 when the client's access status for a given file system 30 has been determined in a previous NFS request 22, (b) authenticate the NFS client 12 when the NFS server 200 provides read only access to all NFS clients for the given file system 30 and the file operation 26 does not require modifying the given file system 30, (c) authenticate the NFS client 12 when the NFS server 200 provides read-write access to all NFS clients for the given file system 30, and (d) make a dynamic authentication request to a resource external to the kernel 200 when none of the necessary conditions in (a)-(c) are met. Thus, the NFS authentication service 252 must be able to receive, perform, and reply to dynamic NFS client authentication requests sent from the NFS service 220. One suitable embodiment for separating the functionality of the dynamic NFS client authentication service 270 is described below in more detail with reference to FIGS. 10–13.

Also shown in FIG. 5 is a network name service 260. As will be appreciated by those skilled in the art, a network name service 260 provides information about computers connected to the network 100. Of particular relevance to the present invention, the network name service 270 is operable to convert the NFS client 12's network source address into a hostname. This may be necessary since the typical share table file 208 is organized by hostnames, while the typical NFS request 22 only indicates the NFS client 12's network source address. This will be discussed below in more detail with reference to FIG. 12.

Figure 6:
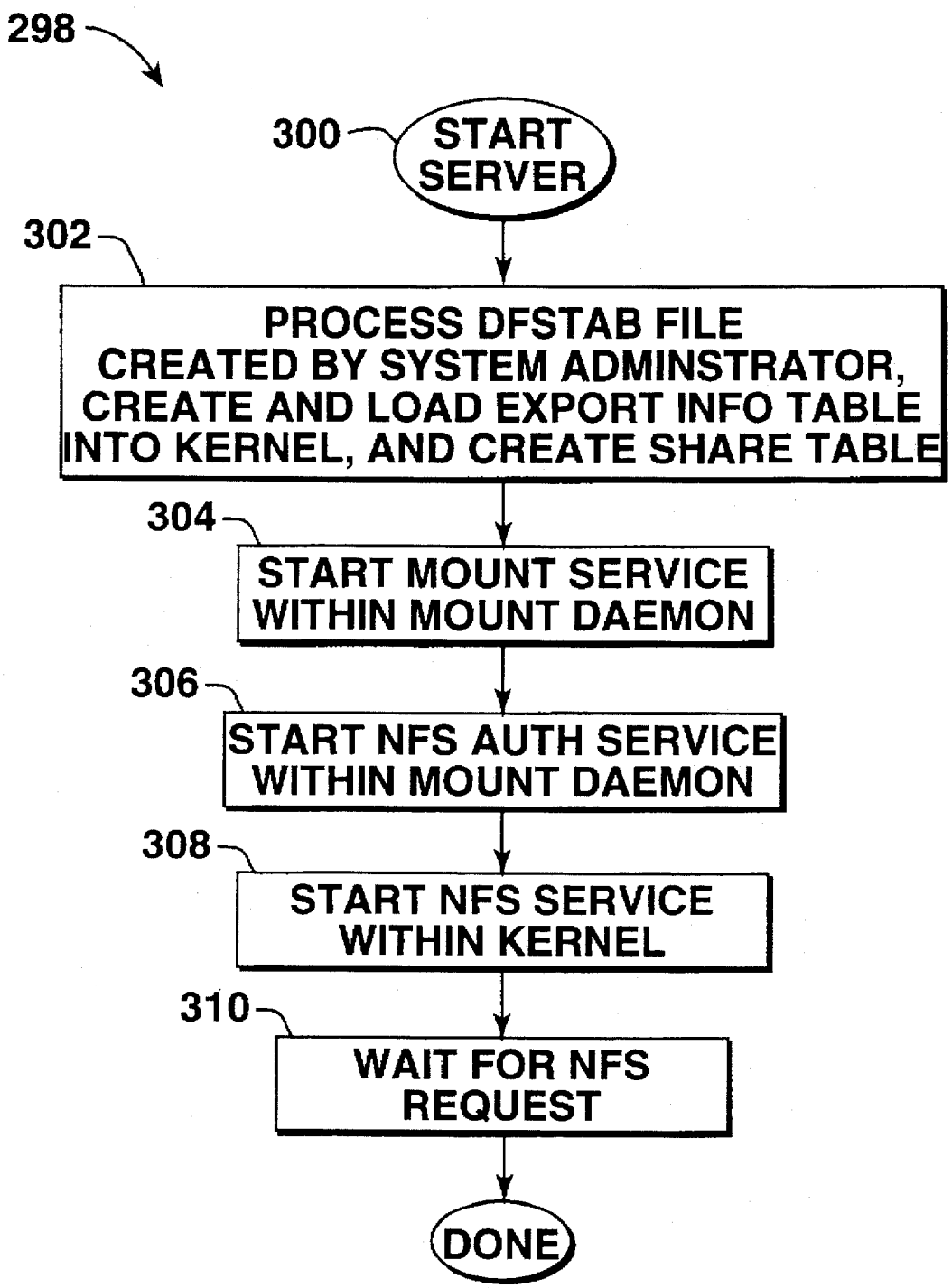
FIG. 6 is a flow chart showing a process by which an NFS server starts in accordance with another embodiment of the present invention.

Turning next to FIG. 6, a initialization method 298 for an NFS server 200 in accordance with one embodiment of the present invention will now be described. The initialization method 298 begins in a step 300 by starting the NFS server 200. A number of steps not directly related to the present invention must be performed in order to bring the NFS server 200 into an operating state. However, these are well understood by those of skill in the art and, hence, no description is provided herein. A next step 302 processes the dfstab file 206 creating the share table file 208 and, internal to the kernel 202, the export info table 222.

After the dfstab file 206 has been processed, a step 304 starts the mount service 250 within the mount daemon 204. Then, a step 306 starts the NFS authentication service 252 within the mount daemon 204. These steps 304 and 306 may be performed in reverse order. Further, as will be appreciated, other embodiments of the present invention may suitably implement the mount service 250 and the NFS authentication service 252 within separate processes or within the kernel 202. Then, a step 308 starts the NFS service 220 within the kernel 202. Once the NFS service 220 is started, in a step 310 the NFS server 200 is ready to process NFS mount and file access requests.

Figure 7:
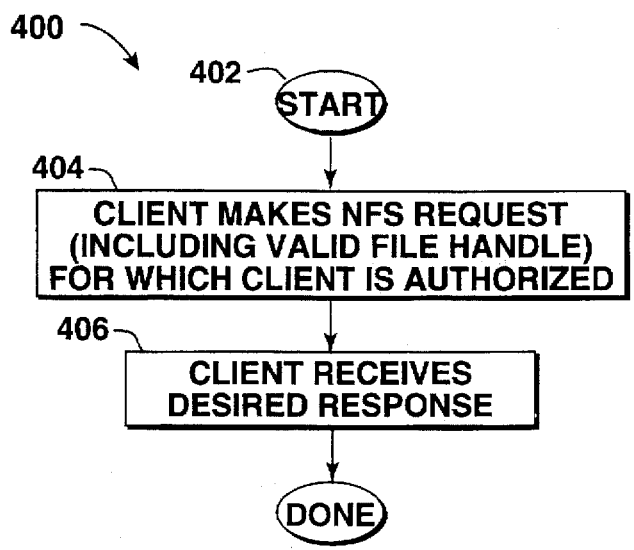
FIG. 7 is a flow chart showing a method by which an NFS client makes an NFS request for which the NFS client is authorized, the method in accordance with one aspect of the present invention.

With reference to FIG. 7, an authentic client response method 400 in accordance with one embodiment of the present invention will now be described. The method 400 begins in a step 402 where any required initialization procedures are performed. If not yet performed, the initialization procedures include those described above with reference to FIG. 6. Next, in a step 404, an NFS client 12 makes an NFS request 22 having a file handle 24 and a file operation 26. As will be appreciated, valid NFS requests include file operations such as read, delete, and modify. In response to the NFS request 22 (and in contrast to the prior art), the NFS server 200 will dynamically authenticate the NFS client 12. That is, the NFS server 200 will determine whether the NFS client 12 has the required access status to perform the file operation 26 upon a given file system 30 identified by the file handle 24. One suitable method for the NFS server 200 to dynamically authenticate the NFS client 12 is described below with reference to FIG. 9. In FIG. 7 the NFS client 12 is authenticated and thus the NFS server 200 implements the file operation 26. Accordingly, in a step 406, the NFS client 12 receives back a desired response 28.

Figure 8:
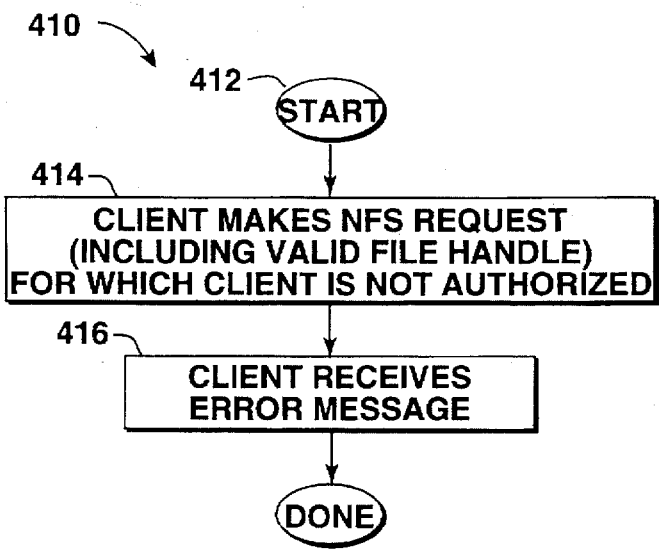
FIG. 8 is a flow chart showing a method by which an NFS client makes an NFS request for which the NFS client is not authorized, the method in accordance with another aspect of the present invention.

Now, turning to FIG. 8, an unauthenticated client response method 410 in accordance with another aspect of the present invention will be described. The method 410 is initiated in step 412 and in a step 414 an NFS client 12 makes an NFS request 22 including a valid file handle 24 and a file operation 26. However (in contrast to the prior art), the NFS server 200 dynamically determines that the NFS client 12 does not have the access status required to perform the requested file operation 26. One suitable method for the NFS server 200 to dynamically authenticate the NFS client 12 is described below with reference to FIG. 9. Accordingly, the NFS server 200 does not perform the requested file operation 26. Instead of receiving the desired response, in a step 416 the NFS client 12 receives an error indication. Hence the NFS server 200's security is not breached.

Figure 9:
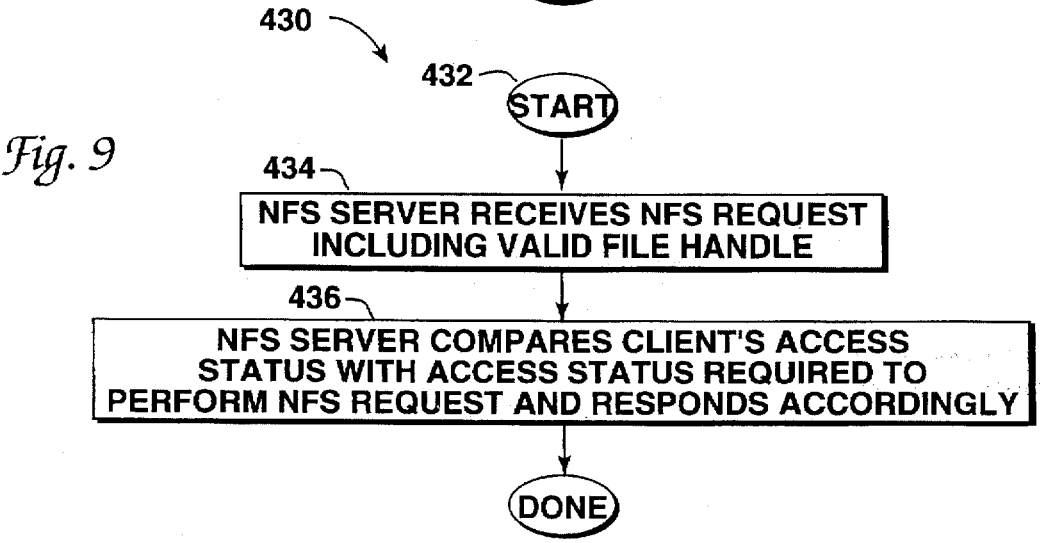
FIG. 9 is a flow chart showing a method by which an NFS server performs dynamic NFS client authentication with regards to an NFS request in accordance with yet another aspect of the present invention.

With reference to FIG. 9, a method 430 for performing dynamic NFS client authentication in accordance with one aspect of the present invention is now described. The method 430 begins in a step 432 which includes any required initialization processes. As will be appreciated, these include network initialization as well as starting a mount daemon 204 and an NFS service 220. Of course, in general these initialization processes need only be done once and subsequent instances of the method 430 would not include such steps.

In a next step 434, the NFS server 200 receives an NFS request 22 from an NFS client 12. As described above with reference to FIG. 5, the NFS request 22 includes a file handle 24 and a file operation 26. As will be appreciated, the file handle 24, if valid, represents a given file system 30 present on the NFS server 200. The file operation 26 is an operation which may be performed on the given file system 30. In response to the request 22, in a step 434 the NFS server 200 compares the client's access status with the access status required to perform the file operation 26 and responds accordingly. For example, if the client had read only access status and the file operation 26 required modifying the given file system 30, the NFS server 200 could respond with an error message informing the NFS client 12 that the required write access status was lacking. The NFS server 200 could also respond by indicating that the requested command could not be performed at this time.

In some implementations, the NFS server 200 may respond to in authentic NFS clients with more severe security measures. By way of example, the NFS server 200 may record in a file and/or on a system terminal that an unauthenticated NFS request 22 was received from NFS client 12. Depending upon the circumstances, the NFS server 200 may determine that the NFS client 12 is attacking and preclude the NFS client 12 from making further NFS requests. One embodiment of step 436 will be described below in more detail with reference to FIG. 10.

Figure 10:
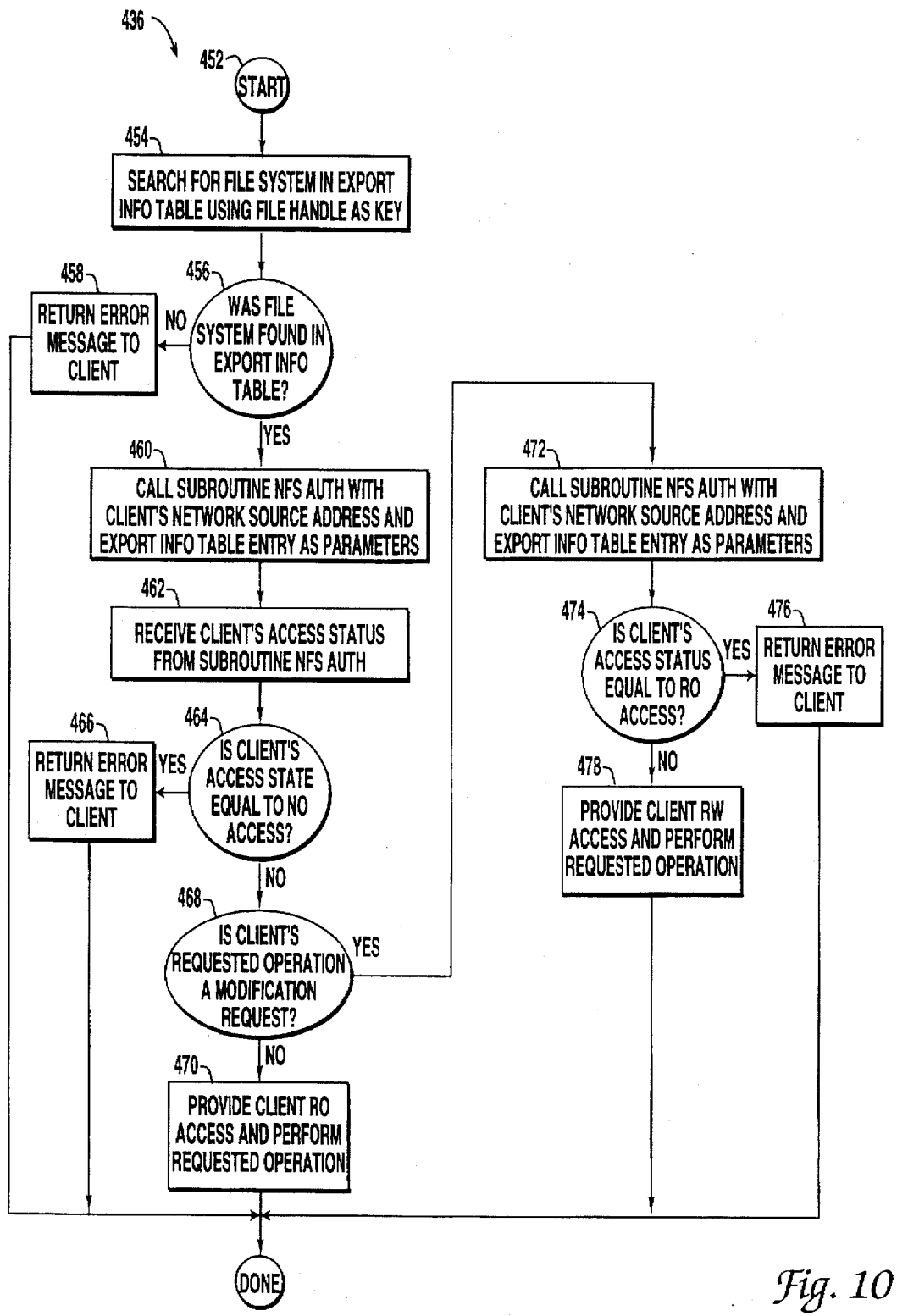
FIG. 10 is a flow chart providing a more detailed showing of step 436 of FIG. 9, the method of FIG. 10 in accordance with a further aspect of the present invention.

Turning next to FIG. 10, a method for performing step 436 of FIG. 9 in accordance with one embodiment of the present invention will now be described. The method begins in step 452 where the NFS service 220 receives and begins responding to the NFS request 22 which the NFS server 200 received in step 434 of FIG. 9. As described above in reference to FIG. 5, the NFS service 220 is implemented within the kernel 202 of the NFS server 200. As will be appreciated, if the format of the NFS request 22 is not suitable for use by the NFS service 220, step 452 may include processing the NFS request 22 to make it suitable for use by the NFS service 220. In general, this processing is done external to the kernel 202. By way of example, data is often marshaled into a format suitable for network transmission, then transmitted over the network. Thus upon receipt of the NFS request, it may be necessary to unmarshal the NFS request 22 prior to utilization by the NFS service 220. However, the network format may be suitable for utilization by the NFS service 220. Of course, these are application specific details which will be familiar to those skilled in the art.

Once the NFS service 220 has a suitably formatted NFS request 22, a search step 454 searches in the export information table 222 for the given file system 30. According to the embodiment described above with reference to FIG. 5, the export information table 222 has entries such as entry 226 having a file system identifier 228, a read only (ro) bit 230, and a read-write (rw) bit 232. In preferred embodiments, the file system identifier 228 is in a format identical to the format of the file handle 24. Thus search step 454 utilizes the file handle 24 as a key to locate the given file system 30 in export information table 222.

Once the export information table 222 has been searched in step 454, a step 456 determines whether the given file system 30 was found in the export information table 222. The given file system 30 is only present in the export information table 222 when the NFS server 200 is making the given file system 30 accessible for sharing. When the given file system 30 is not found in search step 454, control is passed to a step 458 which returns an error message to the NFS client 12. In some embodiments of the present invention, additional or different security measures may be performed. As described above with reference to FIG. 9, these include logging a message on the system terminal, maintaining a file record of unauthenticated client requests, and/or precluding operation of future NFS requests by the NFS client 12.

When search step 454 successfully finds the given file system 30, control is passed from determination step 456 to a step 460. Step 460 calls a subroutine NFS AUTH in order to determine the client's access status. The parameters for the call of step 460 include the client's network source address and the information from the export information table entry 226 corresponding to the given file system 30 (found in step 454). The client's network source address is a numerical identifier of the NFS client 12's network address. For example, if the network is operating under the well known TCP/IP network protocol, then the client's network source address will be the client's Internet protocol (IP) address. One suitable embodiment of subroutine NFS AUTH will be described in detail below with reference to FIG. 11. As will be familiar to those skilled in the art, a subroutine is a portion of computer code which performs a process required at multiple points of execution within the computer code. By implementing such a process via a subroutine, redundancy in the computer code is minimized. However, other suitable embodiments of the present invention may well implement redundant code rather than making calls to a subroutine NFS AUTH.

In any event, in response to the call of step 460, the NFS service 220 receives the client's access status from the subroutine NFS AUTH. As will be appreciated, the client's access status will be one of read only (ro) access, read and write (rw) access, or no access. Control is then passed to a step 464 which determines whether the client's access status is equal to no access. If so, control is passed from step 464 to a step 466 which returns an error message to the NFS client 12. As will be appreciated, other embodiments may perform additional security measures. When the client's access status is something other than no access, control is instead passed to a step 468 which determines whether the requested file operation 26 requires a modification to the given file system 30. When the requested file operation 26 does not require a modification, then in a step 470 the NFS client 12 is provided ro access status and the requested file operation 26 is performed. As will be appreciated, in the case when the requested file operation 26 does not require a modification and the NFS client 12 has an access status other than no access, it is sufficient in step 470 to provide merely ro access status to perform the requested file operation 26.

However, when step 468 determines that the requested file operation 26 requires a modification to the given file system 30, control is passed to a step 472 where the subroutine NFS AUTH is called (again) with the client's network source address and the information from the export information table entry 226 as parameters. This is necessary because, according to the embodiment of FIG. 10, the client's access status is not saved from step 464 to step 472. This is done in order to minimize use of the kernel 202's memory space.

However, in other embodiments, kernel 202 could maintain a copy of the client's access status in which case step 472 could be skipped. In any event, a next step 474 determines whether the client's access status is equal to ro access. When the client's access status is ro access, then the NFS client 12 is not authorized to perform the requested file operation 26 because it has been determined, in step 468, to require a modification to the given file system 30. Accordingly, control is passed to a step 476 which returns an error message to the NFS client 12. Of course, step 476 may implement other appropriate security measures including those described above with reference to step 458. When step 474 determines that the client's access status is not equal to ro, then the client's access status is rw. Thus, a next step 478 provides the NFS client 12 with ro access and performs the requested file operation 26 on the given file system 30.

As will be appreciated, the control flow of the method 10 could be rearranged in a variety of ways, each suitable to determine whether the client's access status for the given file system 30 satisfied the access required for the requested file operation 26.

Figure 11:
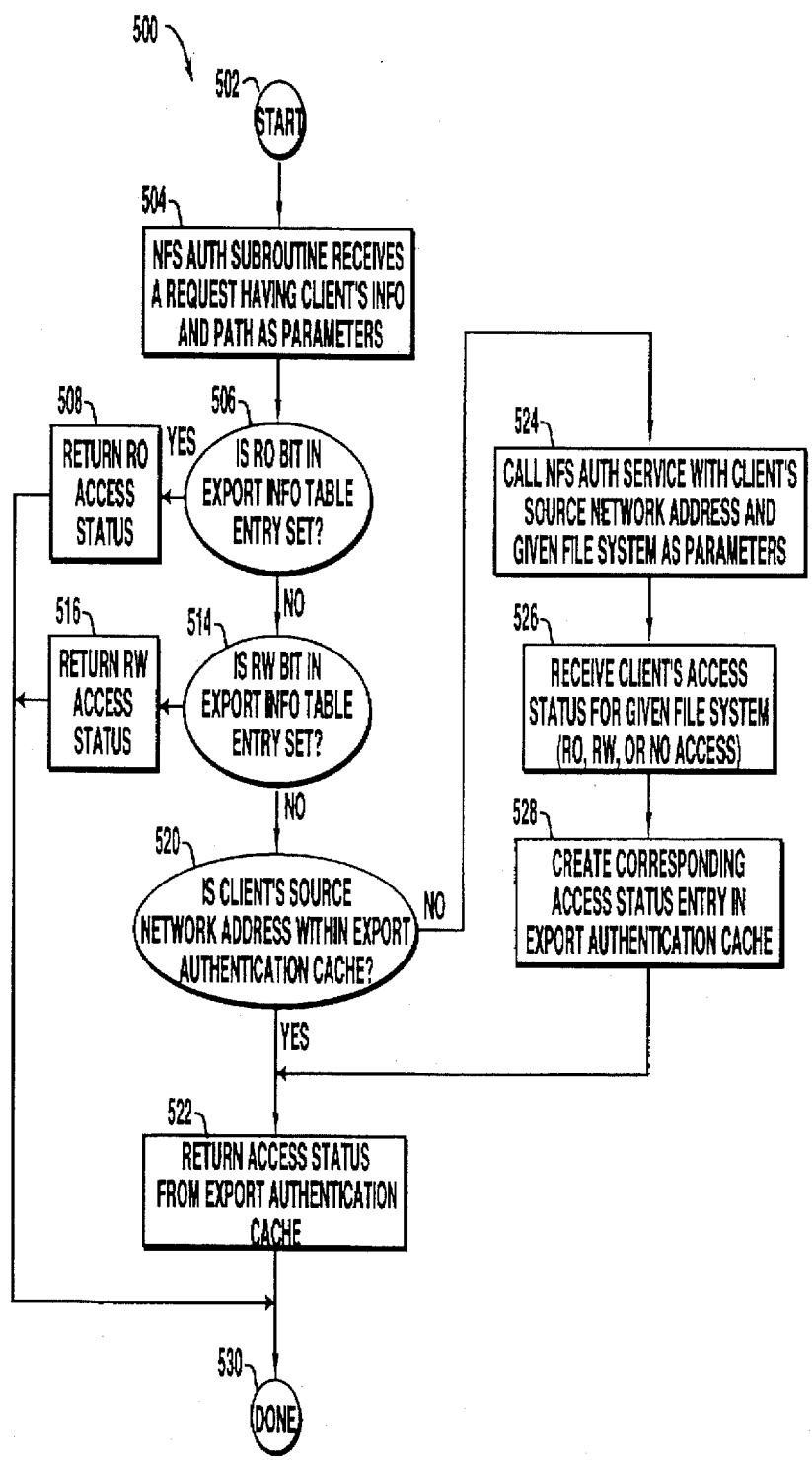
FIG. 11 is a flow chart showing one method for performing that portion of dynamic NFS client authentication which occurs in the NFS server's kernel, the method in accordance with yet another aspect of the present invention.

Turning now to FIG. 11, a method 500 for the subroutine NFS AUTH to respond to a call requesting the access status of an NFS client 12 in accordance with one aspect of the present invention will now be described. As will be appreciated, the method 500 may be incorporated into an NFS service 220 which does not utilize subroutines in order to determine the access status of the NFS client 12. In any event, the method 500 begins in a step 502 which performs any required initialization processes. Then in a step 504 a request for access status having the NFS client 12's information and the file system identifier 228 as parameters is received. A next step 506 determines if the ro bit 230 is set. If so, control is passed to a step 508 which returns an access status of ro for the NFS client 12. Otherwise, a step 514 determines if the rw bit 232 is set and, if so, control is passed to a step 516 which returns an access status of rw for the NFS client 12.

When neither the ro bit 230 nor the rw bit 232 is set for the given file system 30, then a step 520 determines whether the client's source network address is found within an export authentication cache 224. As described above with respect to the embodiment of FIG. 5, each export authentication cache such as export authentication cache 224 is stored in the kernel 202's cache memory and provides information regarding an access status of a specific NFS client. In the embodiment of FIG. 11, each export authentication cache 224 includes a source network address 240, a file system identifier 242, and a client access status 244. As will be understood, the client access status 244 indicates the access status of the NFS client 12 with respect to the resources identified by the file system identifier 242.

When step 520 matches the client's source network address with the source network address 240 in a particular export authentication cache 224, a step 522 returns the value in the corresponding client access status 224 directly and the method 500 is done at step 530. Step 530 then passes control back to the main code of the NFS server 220. In the case where the export authentication cache 224 corresponding to both the given file system 30 and the NFS client 12 is not yet created, control is passed to a step 524. In step 524, the NFS AUTH subroutine calls the NFS authentication service 252, passing the client's network source address and the file handle 24 as parameters. As described above with reference to FIG. 5, in preferred embodiments the NFS authentication service 252 is resident in the mount daemon 204. However, in other suitable embodiments the NFS authentication service 252 could be residing in a separate process, even the kernel 202.

In response to the call of step 524, the NFS AUTH subroutine receives the client's access status with respect to the given file system 30 in a step 526. Then, in a step 528, the NFS AUTH subroutine creates a corresponding entry of export authentication cache 224. Because of this, subsequent queries as to the NFS client 12's access status can be answered directly from the cache memory 224 in the kernel 202. Once the authentication cache 224 is created, control passes to step 522 which returns the NFS client 12's access status directly from cache. Then, in step 530, subroutine NFS AUTH is complete and process control is passed back to the main code of the NFS server 220.

Figure 12:
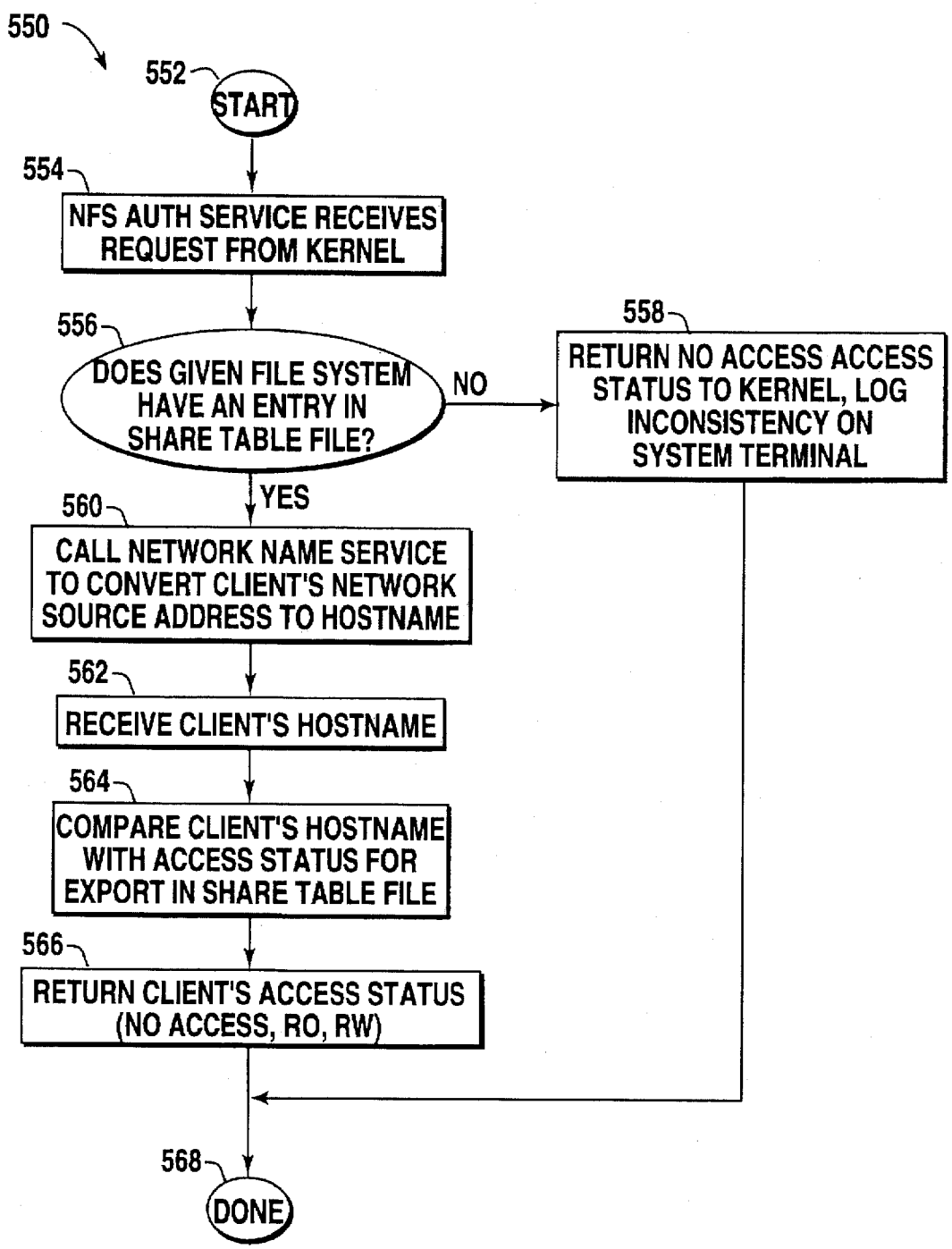
FIG. 12 is a flow chart showing a method for performing that portion of dynamic NFS client authentication which occurs external to the NFS server's kernel, the method in accordance with a still further aspect of the present invention.

Turning now to FIG. 12, a method 550 for an NFS authentication service 252 to determine an NFS client 12's access status to a given file system 30 in accordance with yet another aspect of the present invention will be described. As described above with reference to FIG. 5, the NFS authentication service 252 resides outside the kernel 202 and within the mount daemon 204. This is done merely as a sound computer programming practice. However, in other embodiments of the present invention, the NFS authentication service 252 could reside in a separate process or even within the kernel. This is primarily an application specific detail which may be decided upon implementation of the present invention. The method 550 starts in a step 552 where any necessary initialization processes are performed. Then in a step 554, the NFS authentication service 252 receives a request from the kernel to determine the NFS client 12's access status. A next step 556 searches the share table file 208 to determine if the given file system 30 has an entry therein. If the given file system 30 does not have an entry, then control passes to a step 558 which returns an access status of no access to the kernel 202. In some embodiments, record may be logged of this inconsistency in a file and/or on the system terminal. Once step 558 is done, control is passed to a step 568 where the current instance of the method 550 is complete.

When the given file system 30 does have an entry in the share table file 208, a step 560 calls a network name service 270 to determine the hostname corresponding to the network source address of the NFS client 12. As described above with reference to FIG. 5, the network name service 270 performs network services such as providing a hostname corresponding to a given network source address. Because, in general, the share table file 208 identifies NFS clients by hostnames rather than network source addresses, step 560 is required to enable searching the share table file 208. However, in embodiments where the share table file 208 identifies NFS clients by their network source addresses, step 560 would be unnecessary. In response to step 560, a step 562 receives the hostname associated with the NFS client 12. Then a step 564 searches the share table file 208 to determine the access status of the NFS client 12 for the given file system 30 using the hostname associated with the NFS client 12. As will be appreciated, when an access status is not found for the given file system 30, it merely indicates that the NFS client 12 has a status of no access. Once the access status for the NFS client 12 is determined, a step 566 returns the access status to the kernel 202.

In the embodiment of FIG. 12, the NFS authentication service 252 determined the access status of the NFS client 12 according to the share table file 208. However, in accordance with other embodiments of the present invention, an NFS authentication service 252 can utilize additional resources and/or strategies in determining whether the NFS client 12 is entitled to access a particular file system 30. For example, an NFS server 200 may limit access to certain resources during peak use periods, allowing only a select group or a finite number of clients access during such times. This could be implemented by providing the NFS authentication server 252 the current time and a table of clients authorized for certain resources during the peak periods.

Figure 1:
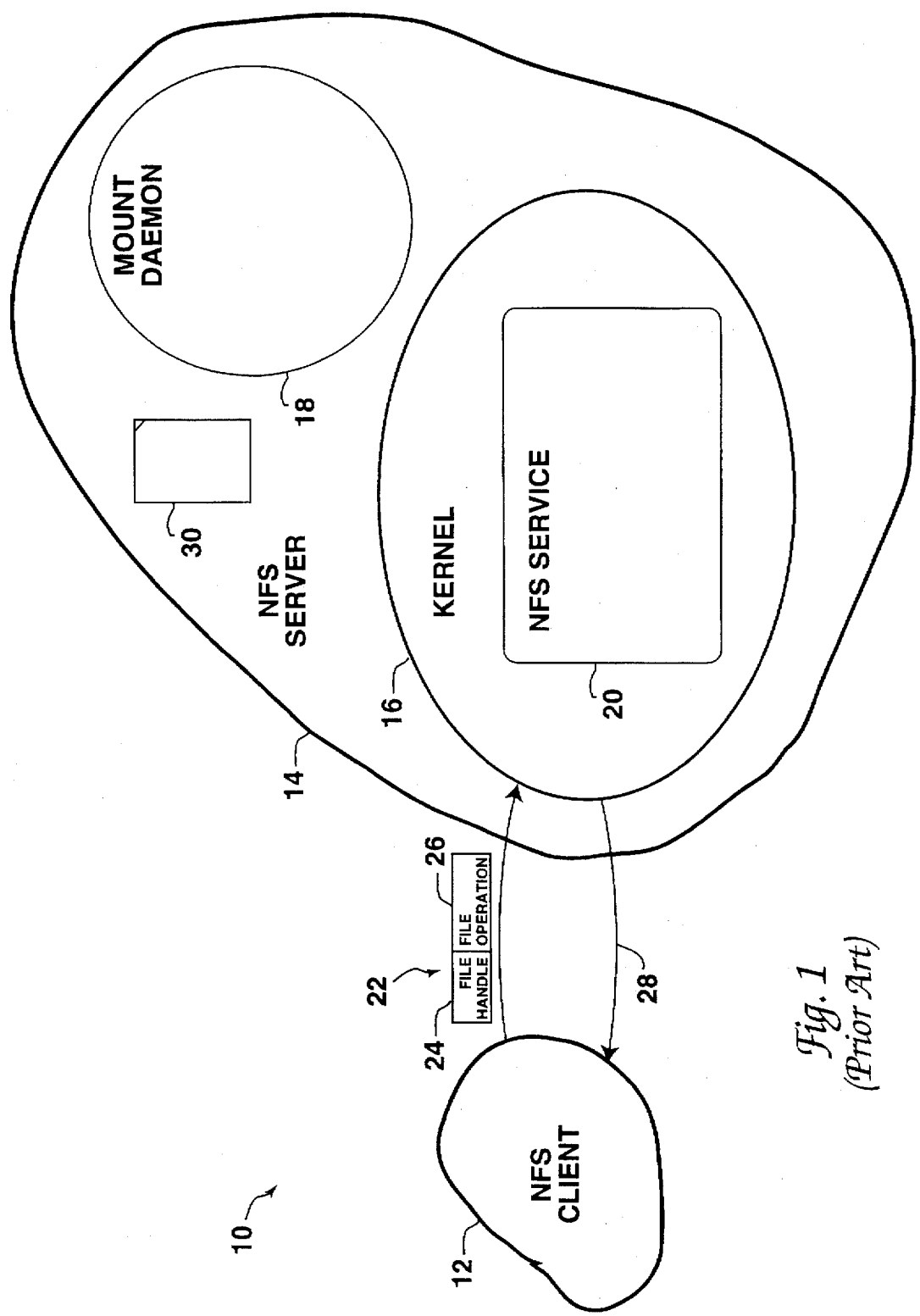
FIG. 1 is a pictorial illustration of an NFS client/server paradigm of the prior art.
Figure 2:
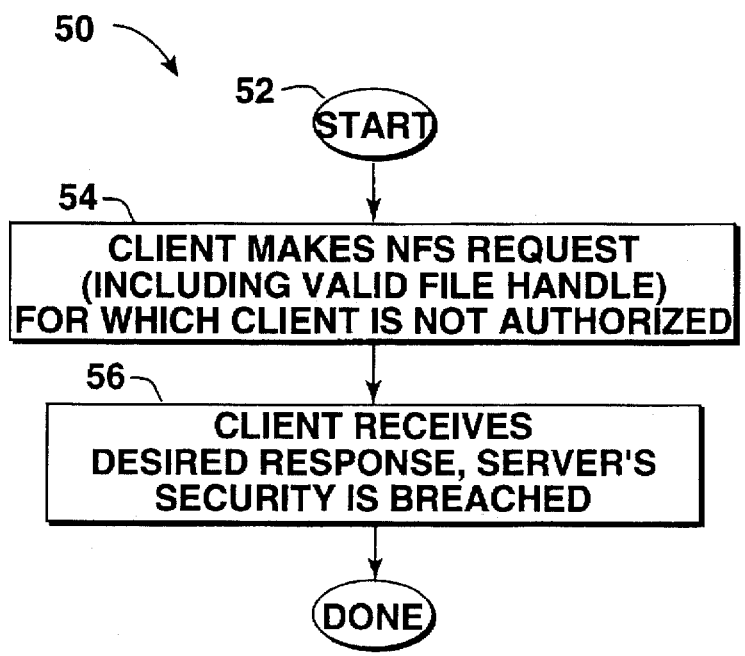
FIG. 2 is a flow chart showing a security breach of an NFS server computer by an attacking NFS client computer having a valid file handle.
Figure 13:
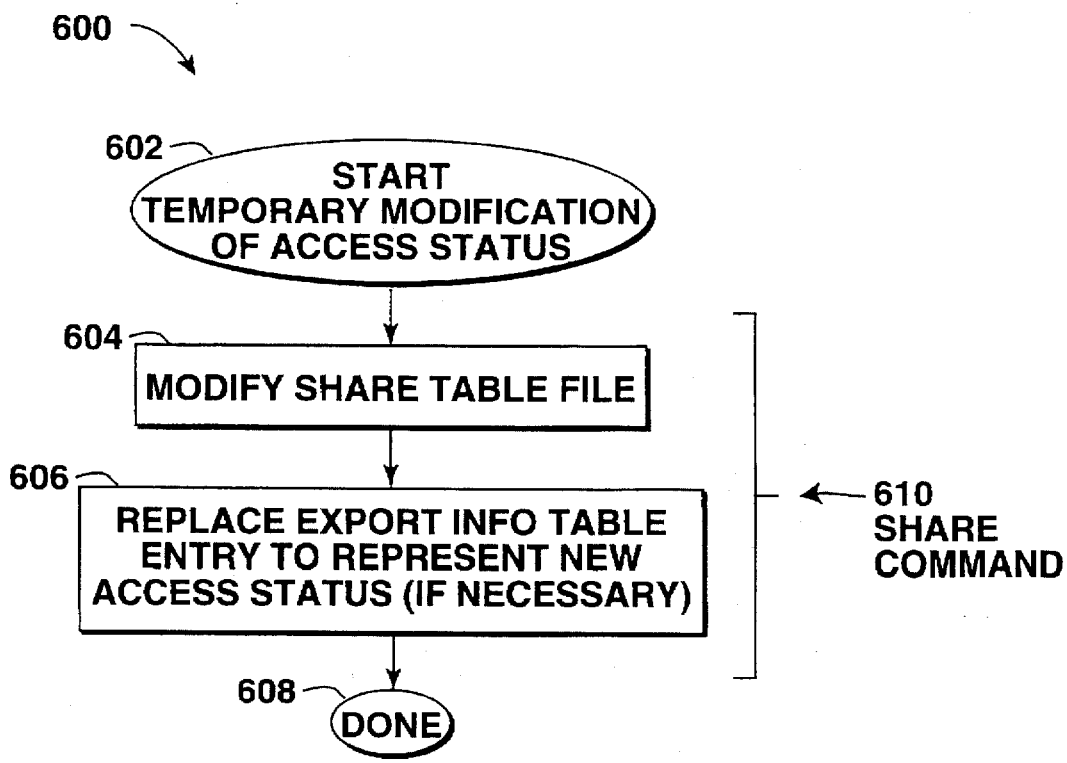
FIG. 13 is a flow chart showing a method for temporarily modifying the access status of an NFS client with respect to a given file system on an NFS server, the method in accordance with one aspect of the present invention.

With reference to FIG. 13, a method 600 for temporarily modifying the access status of an NFS client 12 in accordance with one aspect of the present invention will be described. In addition to providing dynamic NFS client authentication, the teaching of the present invention enables modification of the access status of an NFS client 12 after the NFS client 12 mounts a given file system 30. A step 602 begins the temporary modification which is typically initiated and performed by a system administrator of an NFS server 200. In a step 604, a share table file 208 is modified in accordance with the desired changes in access status for NFS clients. Then a step 606 replaces corresponding entries in an export information table 222 to represent the modified access status. Step 606 also includes purging of the cache 224 entries. The method 600 is then complete in step 608. As will be appreciated, a proper combination of NFS share commands 610 will implement the steps 604 and 606.

The method 600 of FIG. 13 can be adapted to permanently modify the access status of the NFS client 12 by performing modifications equivalent to those made to the share table file 208 on the dfstab file 206. If such modifications are performed, then upon initialization of the NFS server 200, these changes will automatically become part of the share table file 208 and the export information table 222, as described above with reference to FIG. 6.

Although only one embodiment of the present invention has been described, it should be understood that the present invention may be embodied in many other specific forms without departing from the spirit or scope of the invention. For example, the concepts described herein are equally applicable within a variety of distributed file system computing environments. Therefore, the described embodiments should be taken as illustrative and not restrictive, and the invention should be defined by the following claims and their full scope of equivalents.

What is claimed is:

1. A method implemented on a server computer system for providing dynamic client authentication in a distributed file system computing environment, the method comprising the computer controlled steps of:

receiving an NFS request from an NFS client, the NFS request including a file handle representing a given file system available on the server computer system and a file operation to be performed upon the given file system, the given file system modifiable by clients of the server computer having a corresponding access status of read-write with respect to the given file system, readable by clients of the server computer having the corresponding access status of read only with respect to the given file system, and inaccessible to all other clients of the server computer;

dynamically determining whether the NFS client has an access status sufficient to perform the NFS request; and performing the NFS request when the NFS client has sufficient access status.

2. A method as recited in claim 1 wherein the step of determining whether the NFS client has the access status sufficient to perform the NFS request includes the substeps of:

searching an export information table resident on the server computer system to determine whether the given file system has an entry therein; and returning an error indication to the NFS client when the file system is not found in the export information table.

3. A method as recited in claim 2 wherein when the export information table has an entry for the given file system, the entry including a read only bit which when set indicates global read only access to the given file system and a read-write bit which when set indicates global read and write access to the given file system, the read only bit and the read-write bit being exclusive, the step of determining whether the NFS client has an access status sufficient to perform the NFS request further including the substeps of:

when the read only bit is set, setting the client's access status to read only; and when the read-write bit is set, setting the client's access status to read-write.

4. A method as recited in claim 3 wherein when the client's access status is one of read only and read-write and the file operation does not require a modification of the given file system, the client's access status is sufficient to perform the NFS request.

5. A method as recited in claim 3 wherein when the client's access status is read only and the file operation requires a modification of the given file system, the client's access status is not sufficient to perform the NFS request.

6. A method as recited in claim 3 wherein when the client's access status is read-write, the client's access status is sufficient to perform the NFS request.

7. A method as recited in claim 3 wherein when neither the read only bit nor the read-write bit is set, the method further includes the steps of:

searching a cache memory resident on the server computer system to find a specific export authentication cache entry for the NFS client which corresponds to the given file system, the specific export authentication cache entry, when it exists, indicating the client's access status to the given file system; and when the specific export authentication cache entry does not exist, creating the specific export authentication.

8. A method as recited in claim 7 further including the steps of:

setting the client's access status to that indicated by the specific export authentication cache;

when the client's access status is one of read only and read-write and the file operation does not require a modification of the given file system, determining that the client's access status is sufficient to perform the NFS request;

when the client's access status is read only and the file operation requires a modification of the given file system, determining that the client's access status is not sufficient to perform the NFS request; and when the client's access status is read-write, determining that the client's access status is sufficient to perform the NFS request.

9. A method as recited in claim 7 wherein the step of creating the specific export authentication includes the substeps of:

searching a share table file resident on the server computer system to find a share entry for the given file system;

setting the client's access status to no access when the share entry for the given file system is not found in the share table file;

determining the client's access status from the share entry for the given file system when the share entry is found in the share table file; and setting the client's access status according to the share entry for the given file system when the share entry is found in the share table file.

10. A method as recited in claim 9 wherein access status information is stored in the share table file according to client network names and the substep of determining the client's access status from the share entry for the given file system includes calling a network name service available within the NFS computing environment in order to ascertain a network name for the NFS client.

11. A method as recited in claim 9 wherein the client's access status can be dynamically modified, without necessitating the NFS client to dismount, by modifying both the share table file and the export information table to indicate the client's modified access status.

12. A method as recited in claim 1 wherein the given file system is a resource available on the server computer, the resource being selected from the group including a file and a file system hierarchical structure.

13. A method as recited in claim 1 wherein the step of determining whether the NFS client has the access status sufficient to perform the NFS request includes consideration of at least one of time, date, identity of the NFS client, a nature of the NFS request, and a current status of a resource which the NFS request operates upon.

14. A computer readable medium containing a computer program for providing dynamic client authentication to a server computer operating in a distributed file system computing environment, the computer program comprising computer executable instructions for:

receiving an NFS request from an NFS client, the NFS request including a file handle representing a given file system available on the server computer system and a file operation to be performed upon the given file system, the given file system modifiable by clients of the server computer having a corresponding access status of read-write with respect to the given file system, readable by clients of the server computer having the corresponding access status of read only with respect to the given file system, and inaccessible to all other clients of the server computer;

dynamically determining whether the NFS client has an access status sufficient to perform the NFS request; and performing the NFS request when the NFS client has sufficient access status.

15. A computer readable medium as recited in claim 14 wherein the computer executable instruction of determining whether the NFS client has the access status sufficient to perform the NFS request includes subinstructions for:

searching an export information table resident on the server computer system to determine whether the given file system has an entry therein; and returning an error message to the NFS client when the file system is not found in the export information table.

16. A computer readable medium as recited in claim 15 wherein the export information table has an entry for the given file system, the entry including a read only bit which when set indicates global read only access to the given file system and a read-write bit which when set indicates global read and write access to the given file system, the read only bit and the read-write bit being exclusive, and the computer program instruction for determining whether the NFS client has an access status sufficient to perform the NFS request further includes the computer executable subinstructions of:

setting the client's access status to read only when the read only bit is set; and setting the client's access status to read-write when the read-write bit is set.

17. A computer readable medium as recited in claim 16 further including computer executable instructions such that when the client's access status is one of read only and read-write and the file operation does not require a modification of the given file system, the client's access status is sufficient to perform the NFS request.

18. A computer readable medium as recited in claim 16 further including computer executable instructions such that when the client's access status is read only and the file operation requires a modification of the given file system, the client's access status is not sufficient to perform the NFS request.

19. A computer readable medium as recited in claim 16 further including computer executable instructions such that when the client's access status is read-write, the client's access status is sufficient to perform the NFS request.

20. A computer readable medium as recited in claim 16 further including computer executable instructions such that when neither the read only bit nor the read-write bit is set, the computer program further executes the computer instructions for:

searching a cache memory resident on the server computer system to find a specific export authentication cache entry for the NFS client which corresponds to the given file system, the specific export authentication cache entry, when it exists, indicating the client's access status to the given file system; and when the specific export authentication cache entry does not exist, creating the specific export authentication.

21. A computer readable medium as recited in claim 20 further including computer program instructions for:

setting the client's access status to that indicated by the specific export authentication cache;

when the client's access status is one of read only and read-write and the file operation does not require a modification of the given file system, determining that the client's access status is sufficient to perform the NFS request;

when the client's access status is read only and the file operation requires a modification of the given file system, determining that the client's access status is not sufficient to perform the NFS request; and when the client's access status is read-write, determining that the client's access status is sufficient to perform the NFS request.

22. A computer readable medium as recited in claim 20 wherein the computer program instruction for creating the specific export authentication includes the computer executable subinstructions for:

searching a share table file resident on the server computer system to find a share entry for the given file system;

setting the client's access status to no access when the share entry for the given file system is not found in the share table file;

determining the client's access status from the share entry for the given file system when the share entry is found in the share table file; and setting the client's access status according to the share entry for the given file system when the share entry is found in the share table file.

23. A computer readable medium as recited in claim 14 wherein the given file system is a resource available on the server computer, the resource being selected from the group including a file and a file system hierarchical structure.

24. A computer readable medium as recited in claim 14 wherein the computer program instruction for determining whether the NFS client has the access status sufficient to perform the NFS request considers at least one of time, date, identity of the NFS client, a nature of the NFS request, and a current status of a resource which the NFS request operates upon.

25. A server computer for use in a distributed file system computing environment, the server computer operable to provide dynamic NFS client authentication, the server computer comprising:

a central processing unit (CPU);

a random access memory accessible by the CPU;

a read only memory accessible by the CPU;

a network input/output port coupled with the CPU;

a mass storage device accessible by the CPU, the mass storage device capable of storing a given file system modifiable by clients of the server computer having an access status of read-write with respect to the given file system, readable by clients of the server computer having the access status of read only with respect to the given file system, and inaccessible to all other clients of the server computer;

a kernel implemented on the server computer, the kernel implementing primitive functions of an operating system for the server computer; and a dynamic NFS client authentication service operable to receive an NFS request from an NFS client and to dynamically authenticate the NFS client in relation to the NFS request, the dynamic NFS client authentication service considering at least one of time, date, identity of the NFS client, a nature of the NFS request, and a current status of a resource which the NFS request operates upon.

26. A server computer as recited in claim 25 wherein the dynamic NFS client authentication service includes:

an NFS service implemented within the kernel, the NFS service operable to receive the NFS request from the NFS client, the NFS request including a file handle identifying the given file system and a file operation to be performed on the given file system, the client's access status for the given file system being one of no access, read only access, and read-write access, the NFS service also operable to (a) authenticate the NFS client when the client's access status for the given file system has been determined in a previous NFS request, (b) authenticate the NFS client when the server computer provides read only access to all NFS clients for the given file system and the file operation does not require modifying the given file system, (c) authenticate the NFS client when the server computer provides read-write access to all NFS clients for the given file system, and (d) make a dynamic authentication request to a resource external to the kernel when none of the necessary conditions in (a)-(c) are met; and an NFS authentication service implemented on the server computer system and external to the kernel, the NFS authentication service being operable to receive, perform, and reply to dynamic NFS client authentication requests sent from the NFS service.

27. A server computer as recited in claim 26 wherein the kernel includes:

an export information table resident in the kernel, the export information table having entries for a plurality of file systems available on the server computer, each entry being identical in format, an entry for a specific file system including a read only bit which when set indicates global read only access to the specific file system and a read-write bit which when set indicates global read and write access to the specific file system, the read only bit and the read-write bit being exclusive; and a cache memory for storing a plurality of export authentication cache entries, a particular export authentication cache entry including identifiers for a file system and an NFS client, and an access status of the NFS client with respect to a file system identified by the file system identifier.

28. A server computer as recited in claim 25 further including a share table file including a list of file systems available for sharing on the server computer and a corresponding plurality of client's access status.

29. A computer network including a plurality of computer systems, wherein a one of the plurality of computer systems is a server computer as recited in claim 25.

30. A method implemented on a server computer system for providing dynamic client authentication in a distributed file system computing environment, the method comprising the computer controlled steps of:

receiving an NFS request from an NFS client, the NFS request including a file handle representing a given file system available on the server computer system and a file operation to be performed upon the given file system, the given file system modifiable by clients of the server computer having a corresponding access status of read-write with respect to the given file system, readable by clients of the server computer having the corresponding access status of read only with respect to the given file system, and inaccessible to all other clients of the server computer;

searching an export information table resident on the server computer system to determine whether the given file system has an entry therein, the export information table having an entry for the given file system, the entry including a read only bit which when set indicates global read only access to the given file system and a read-write bit which when set indicates global read and write access to the given file system, the read only bit and the read-write bit being exclusive;

when the read only bit is set, setting the client's access status to read only;

when the read-write bit is set, setting the client's access status to read-write;

when neither the read only bit nor the read-write bit is set, performing the following substeps of:

(a) searching a cache memory resident on the server computer system to find a specific export authentication cache entry for the NFS client which corresponds to the given file system, the specific export authentication cache entry, when it exists, indicating the client's access status to the given file system to which the client's access status is then set; and (b) when the specific export authentication cache entry does not exist, creating the specific export authentication cache entry and then setting the client's access status to that indicated by the newly created specific export authentication cache entry, the specific export authentication cache entry creation including:

(i) searching a share table file resident on the server computer system to find a share entry for the given file system;
(ii) setting the client's access status to no access when the share entry for the given file system is not found in the share table file;
(iii) determining the client's access status from the share entry for the given file system when the share entry is found in the share table file; and
(iv) setting the client's access status according to the share entry for the given file system when the share entry is found in the share table file; and performing the NFS request when either (i) the client's access status is read only and the file operation does not require a modification of the given file system or (ii) the client's access status is read-write.

* * * * *